(12) United States Patent
Meruva et al.

(10) Patent No.: US 10,878,650 B1
(45) Date of Patent: Dec. 29, 2020

(54) ACCESS CONTROL SYSTEM USING MOBILE DEVICE

(71) Applicant: Honeywell International Inc., Morris Plains, NJ (US)

(72) Inventors: Jayaprakash Meruva, Bangalore (IN); Chaithanya Holla, Bangalore (IN); KamalaKannan Balraj, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/439,024

(22) Filed: Jun. 12, 2019

(51) Int. Cl.
*G07C 9/28* (2020.01)
*G07C 9/00* (2020.01)
*H04W 12/08* (2009.01)
*G06F 21/35* (2013.01)
*H04W 12/06* (2009.01)

(52) U.S. Cl.
CPC .............. *G07C 9/28* (2020.01); *G06F 21/35* (2013.01); *G07C 9/00309* (2013.01); *G07C 9/00904* (2013.01); *H04W 12/06* (2013.01); *H04W 12/08* (2013.01); *G07C 2009/00793* (2013.01)

(58) Field of Classification Search
CPC ..... G07C 9/28; G07C 9/00309; H04W 12/08; H04W 12/06
USPC ....................................... 340/5.61
See application file for complete search history.

(56) References Cited

U.S. PATENT DOCUMENTS

| | | | |
|---|---|---|---|
| 4,672,654 A | 6/1987 | Vanacore | |
| 7,969,302 B2 | 6/2011 | Srinivasa et al. | |
| 9,058,702 B2 | 6/2015 | Chao et al. | |
| 9,076,273 B2 | 7/2015 | Smith et al. | |
| 9,292,985 B2 | 3/2016 | Ahearn et al. | |
| 9,444,805 B1 | 9/2016 | Saylor et al. | |
| 9,472,034 B2 | 10/2016 | Ahearn et al. | |
| 9,514,469 B2 | 12/2016 | Fuchs et al. | |
| 9,589,403 B2 | 3/2017 | Lingan et al. | |
| 9,713,002 B2 | 7/2017 | Roy et al. | |
| 10,096,182 B2 | 10/2018 | Prasad et al. | |
| 10,182,309 B2 | 1/2019 | Mahasenan et al. | |
| 10,186,098 B2 | 1/2019 | Lingan et al. | |

(Continued)

FOREIGN PATENT DOCUMENTS

| CN | 104144497 A | 11/2014 |
|---|---|---|
| EP | 2085934 A1 | 8/2009 |

OTHER PUBLICATIONS

Fave et al., "Game-theoretic Security Patrolling with Dynamic Execution Uncertainty and a Case Study on a Real Transit System," Journal of Artificial Intelligence Research 50, Jun. 2014, 47 pp.
"Logosoft brings lone worker supervision into the Android era," http://www.securitynewsdesk.com/logosoft-brings-lone-worker-supervision-android-era/, May 29, 2014, 7 pp.

(Continued)

*Primary Examiner* — Vernal U Brown
(74) *Attorney, Agent, or Firm* — Seager Tufte & Wickhem LLP

(57) ABSTRACT

A method of controlling access through a door may include storing a user's digital identity and a user's access policy in a memory of the user's mobile device, which may use the stored user's digital identity and the stored user's access policy to determine whether the user is authorized for access through the door and to make an access decision of YES or NO. The access decision may be communicated to the reader, which controls operation of a door lock in accordance with whether the access decision was YES or NO.

20 Claims, 10 Drawing Sheets

(56) References Cited

U.S. PATENT DOCUMENTS

| | | |
|---|---|---|
| 2005/0242957 A1 | 11/2005 | Lindsay et al. |
| 2009/0249433 A1 | 10/2009 | Misra et al. |
| 2010/0102993 A1 | 4/2010 | Johnson |
| 2011/0291798 A1 | 12/2011 | Schibuk |
| 2013/0021145 A1 | 1/2013 | Boudy |
| 2013/0314210 A1 | 11/2013 | Schoner et al. |
| 2014/0049361 A1 | 2/2014 | Ahearn et al. |
| 2014/0342667 A1 | 11/2014 | Aarnio |
| 2014/0375421 A1 | 12/2014 | Morrison et al. |
| 2016/0189454 A1 | 6/2016 | Johnson et al. |
| 2016/0335819 A1 | 11/2016 | Lingan et al. |
| 2016/0337508 A1 | 11/2016 | Roy et al. |
| 2017/0076523 A1* | 3/2017 | Rumble ............... G06Q 20/127 |
| 2017/0270732 A1 | 9/2017 | Troesch et al. |
| 2017/0280322 A1 | 9/2017 | Roy et al. |
| 2017/0289753 A1 | 10/2017 | Mahasenan et al. |
| 2018/0068503 A1 | 3/2018 | Prasad et al. |
| 2018/0068507 A1 | 3/2018 | Prasad et al. |
| 2018/0144568 A1 | 5/2018 | Lingan et al. |

OTHER PUBLICATIONS

Sookman "Smartphones are Key to the Future of Security," https://www.guardly.com/blog/2015/02/04/smartphones-are-key-to-the-future-of-security/index.html, Feb. 4, 2015, 5 pp.

Bobescu et al., "Mobile indoor positioning using wi-fi localization," Review of the Air Force Academy, 2015, No. 1 (28), 4 pp.

Bhargava et al., "Physical Authentication through Localization in Wireless Local Area Networks," Global Telecommunications Conference, GLOBECOM '05 IEEE, Jan. 23, 2006, 5 pp.

"Passive Entry Door System with Proximity Sensor," http://www.atmel.com/Images/Atmel-42582-Passive-Entry-Door-System-with-Proximity-Sensor_Application%20Note_AT12649.pdf, Nov. 2015, 22 pp.

Bellido-Outeirno, "Universal Bluetooth Access Control and Security System," International Journal on Advances in Security, 2011, vol. 4 No. 3 and 4, 10 pp.

"Mobile Access Control: the Ultimate Guide," KISI, 10 pages, accessed Jun. 17, 2019.

* cited by examiner

ACCESS CONTROL SYSTEM USING MOBILE DEVICE

TECHNICAL FIELD

The present disclosure pertains generally to methods of gaining access to a controlled space and more particularly to methods of using mobile devices in gaining access to a controlled space.

BACKGROUND

A number of buildings include rooms, areas or spaces to which there is a desire to limit access. Traditional access systems require a user to provide some form of identification to an access system, and the access system then determines whether the user is authorized to access a particular room, area or space. A traditional access system may, for example, include an electronic lock that can be selectively locked or unlocked in order to prevent or provide access through a door into a space. The traditional access system may include a card reader or other device for identifying a user, and may include a card reader or other device on each side of the door. The card reader(s) and electronic lock(s) of a building are typically wired to a central access controller, wherein the central access controller stores access control policies for each user and each door. Access control decisions are typically made by the central access controller and/or card reader(s) in real or near real-time. A need remains for a simplified access system.

SUMMARY

The disclosure relates generally to methods and systems for controlling access to a controlled space using a user's mobile device to make at least part of a decision as to whether a particular user is authorized to gain access to a particular space in a building at a particular time. An example of the disclosure includes a method for controlling access through a door having a door lock that can be electrically locked and unlocked. The door lock is operably coupled to a reader that is configured to establish local communication with a user's mobile device and to establish non-local communication with a remote server. The example method further includes storing a user's digital identity and a user's access policy in a memory of the user's mobile device and the user's mobile device using the stored user's digital identity and the stored user's access policy to determine whether or not the user is authorized for access through the door and to make an access decision of YES or NO. The access decision may be communicated to the reader along with the user's digital identity and the reader may store the communicated access decision and user's digital identity for subsequent communication to the remote server. When the access decision is YES, the door lock is unlocked so that the user is free to pass through the door and when the access decision is NO, the door lock is not unlocked.

Another example of the disclosure may be found in a mobile device that is configured to selectively grant access to a space within a facility having a door restricting access to the space within the facility. The example mobile device may include a memory that is configured to store a user's digital identity as well as a user's access policies. A controller may be operably coupled to the memory and may be configured to access the user's digital identity and the user's access policies from the memory and to use the user's digital identity and the user's access policies to determine whether the user is authorized to access the space to which the door restricts access. An output may be operably coupled to the controller and may be configured to communicate with a reader that is associated with the door in order to unlock a lock apparatus of the door when the controller determines that the user is authorized to access the space to which the door restricts access.

Another example of the disclosure can be found in a non-transient computer-readable medium having instructions stored thereon that are executable by a processor of a mobile device. When the instructions are executed, the mobile device may store a user's digital identity and a user's access policy and to identify an identity of a locked door that the user wants to enter. The mobile device may then uses the user's digital identity, the user's access policy and the identity of the locked door to determine, via a controller of the mobile device, whether the user is authorized to access the locked door. When the determination is made by the controller of the mobile device that the user is authorized to access the locked door, the mobile device may be instructed to transmit instructions to unlock the locked door.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
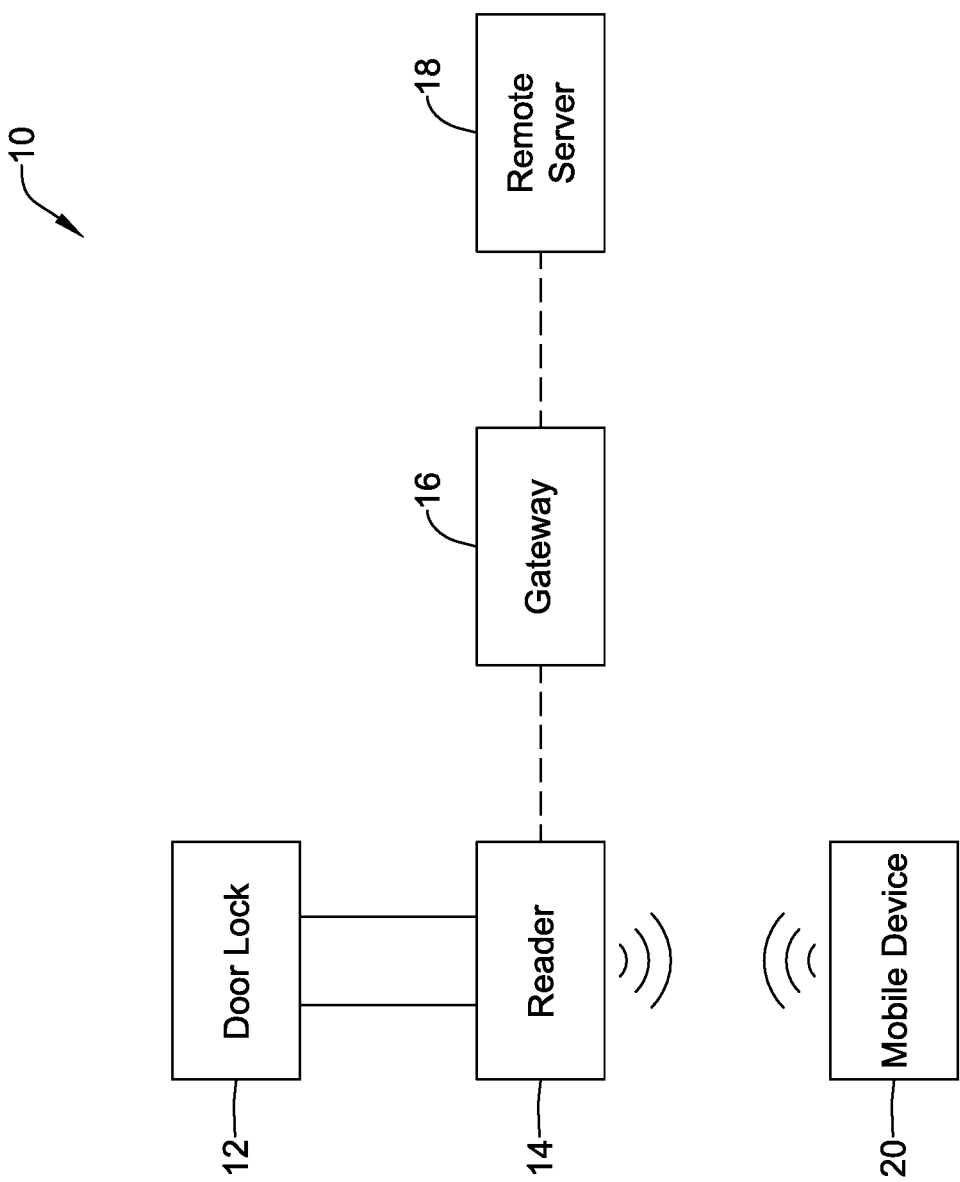
FIG. 1 is a schematic block diagram of an illustrative access control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative access control system 10. The access control system 10 includes a door lock 12 that may be positioned to selectively lock and unlock a door (not illustrated). The door lock 12 may be an electronically controlled lock such as a magnetic door lock, but other electronically controlled locks are contemplated. A reader 14 may be configured to control operation of the door lock 12. For example, the reader 14 may instruct the door lock 12 to change from a locked configuration to an unlocked configuration. Alternatively or additionally, the reader 14 may instruct the door lock 12 to change from an unlocked configuration to a locked configuration. In the example shown, the reader 14 may be communicatively coupled with a gateway 16. The gateway 16 may include a modem or router, for example, and may itself be configured to communicate with a remote server 18. Accordingly, the reader 14 may communicate with the remote server 18 via the gateway 16. This communication may be two-way communication, meaning that not only can the reader 14 receive information from the remote server 18, but that the reader 14 can also transmit information to the remote server 18. The remote server 18 may in some cases be a cloud server, but this is not required in all cases.

As an example, the remote server 18 may include information related to which doors a particular user has access to, and which doors a particular user is not authorized to pass through. This information, which may include a user's access policy, may be communicated to the particular user's mobile device 20. In some cases, the user's access policy may additionally be transmitted to the reader 14 via the gateway 16 so that the reader 14 may provide an updated user's access policy to the mobile device 20, for example. The user's access policy may include detailed information as to which spaces the particular user is authorized to access, the conditions under which the user is authorized to access the space, time and date periods during which the user is authorized to access the space, and so on. A lower level employee may have access to their workspace and the lunchroom, but not have access to various labs and other spaces. The lower level employee may be limited to accessing their authorized spaces during certain time periods, such as Monday through Friday, 8 AM to 6 PM, and thus would not be permitted to pass at 7 AM on a Monday, or anytime on a Saturday or Sunday. An intermediate level employee may have access to the same spaces, but may be authorized to access these spaces seven days a week, 24 hours a day. A higher level employee may have access to all spaces and at all times. These are just examples.

This information may also include a facility policy that may be communicated from the remote server 18 to the reader 14 via the gateway 16. A facility policy may not be limited to a particular individual, but instead may describe limitations that apply to many or even all employees. An example might be that a particular door is to remain unlocked every weekday Monday through Friday, from 7 AM to 7 PM. Another example might be that a particular door is to remain locked, with no access available, all day on Saturdays and Sundays, regardless of the employee. These are just examples.

In some cases, an exception policy may be communicated from the remote server 18 to the reader 14 via the gateway 16. An exception policy may specify, for example, that a particular space will be closed for a period of time for cleaning, or remodeling. An exception policy may specify that a particular door or set of doors is to remain unlocked for a particular period of time corresponding to an event. For example, particular doors may remain unlocked during a scheduled open house. Another example of an exception policy may be that a particular user may not have an updated or current user access policy. In some cases, the exception policy may be part of the facility policy, while in other cases, it may be separate. It will be appreciated that the access control system 10 may be configured to permit periodic updates to the user access policies, the facility policy and the exception policies to be communicated from the remote server 18 to the reader 14 via the gateway 16. Periodic updates may be scheduled, for example, or may occur when network connectivity permits communication between the reader 14 and the gateway 16, and/or between the gateway 16 and the remote server 18.

A mobile device 20 may be configured to communicate with the reader 14. The mobile device 20 may be a smartphone, for example, but may be any other suitable mobile device that can be carried by the user. The mobile device 20 may communicate with the reader 14 via WiFi, Bluetooth™, infrared (e.g. IrDA), or any other suitable wireless or wired communication path. When the mobile device 20 establishes wireless communication with the reader 14, any policy updates stored in the reader 14 (previously received from the remote server 18 via the gateway 16) may be communicated to the mobile device 20. In some cases, the policy updates (e.g. user's access policy updates) may be communicated to the mobile device 20 via a separate wireless communication path, such as cellular, Wifi or other communication path. Policy updates need not be communicated to the mobile device 20 for the user to gain access through a door. Instead, policy updates may be obtained when the mobile device 20 has communication available with the reader 14 and/or remote server 18.

In some cases, the reader 14 may communicate a location to the mobile device 20, such that the mobile device 20 knows which door that the mobile device 20 is proximate to. Alternatively, the mobile device 20 may receive a signal from one or more wireless beacons in the building (not shown) that identifies a particular door. In some cases, the user of the mobile device 20 may use the mobile device 20 to take a picture or otherwise scan an image displayed proximate the door, which can be decoded to inform the mobile device 20 as to the location of a particular door. The image may be a barcode or a QR code, for example. In some cases, the user may select a particular door via a user interface of the mobile device. These are just examples.

Once the mobile device 20 has been informed of which door the user wishes to access, the mobile device 20 may be configured to use information stored within the mobile device 20 to determine whether the user is authorized to gain access through that particular door at this particular point in time. The mobile device 20 may rely upon the user's digital identity (stored within the mobile device 20) and the user's access control policy (also stored within the mobile device 20). The user's digital identity may include information that identifies the user. This may include an ID number such as a company ID number, a driver's license number or a social security number, for example. In some cases, the user's digital identity may include biometric information of the user. In some cases, the user's digital identity may include a confirmation by the mobile device 20 of certain biometric information of the user, such a positive retinal or finger print scan. In some case, the positive retinal or finger print scan may be used to unlock the mobile device by the user.

The mobile device 20 may also rely upon one or more of a facility policy, an exception policy and a user's context information. Examples of the user's context information may include a history of which doors the user has previously accessed, and when. Based on some or all of this information, the mobile device 20 may determine whether the user is authorized to gain access to the particular door, or not. The mobile device 20 may then transmit the decision, which may for example be a YES decision or a NO decision, to the reader 14.

The reader 14 may directly communicate an instruction to the door lock 12, such as instructions to lock or unlock the door lock 12. If the access control decision communicated to the reader 14 is YES, for example, the reader 14 may instruct the door lock 12 to unlock temporarily. In some instances, particularly if the reader 14 has a policy such as a facility policy or an exception policy that is updated relative to the same policy stored in the mobile device 20, the reader 14 may override the decision made by the mobile device 20, regardless of whether the updated policy stored in the reader 14 disagrees with the policy currently stored in the mobile device 20. In some instances, if the user access policy was previously transmitted to the reader 14, it is contemplated that the reader 14 may use such an updated user access policy to override the decision made by the mobile device 20 only when the updated policy stored in the reader 14 disagrees with the policy currently stored in the mobile device 20. In some cases, the reader 14 may immediately communicate any policy updates to the mobile device 20 to reduce or eliminate subsequent policy disagreements. Alternatively, the mobile device will need to connect to the remote server 18 and obtain the updates from the remote server 18 before access is granted. These are just examples.

While FIG. 1 shows a single door lock 12 and a single reader 14, it will be appreciated that a facility will typically have a number of door locks 12 and a corresponding number of readers 14, with each door having a single door lock 12 and a single reader 14. Because the reader 14 may communicate wirelessly with the mobile device 20, rather than through a line of sight form of communication, there is no need to have a separate reader 14 on each side of a particular door. Rather, a single reader 14 may be configured to receive an access decision from the mobile device 20, regardless of whether the user wishes to pass through the door to enter the space, or whether the user wishes to pass through the door to exit the space.

Figure 2:
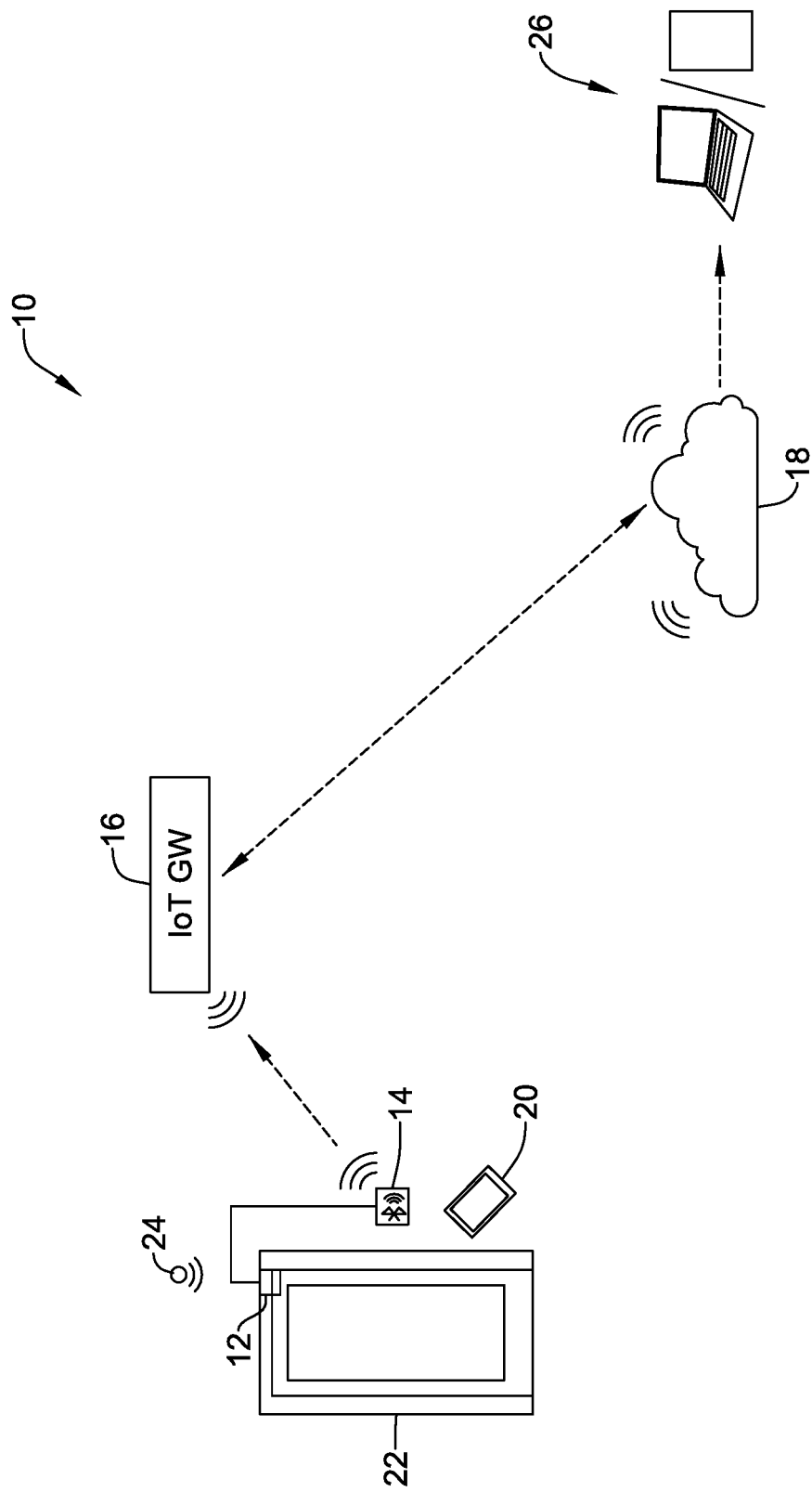
FIG. 2 is a schematic diagram of an illustrative access control system.

FIG. 2 is a schematic diagram of an illustrative access control system, such as access control system 10 shown in FIG. 1. In FIG. 2, the access control system 10 may be seen as including a door 22 and a location identifier 24 that is positioned proximate the door 22 and that wirelessly provides the location of the door 22 to the mobile device 20. Armed with this information, the mobile device 20 is able to use the user's digital identity and the user's access policy, optionally along with one or more of a facility policy, an exception policy and the user's context information, to determine whether the user is authorized to pass through the door 22. In some cases, the location identifier 24 may be a wireless beacon that is configured to communicate with the mobile device 20 via WiFi or Bluetooth™, for example. Alternatively, the location identifier 24 may be a scannable image that may be photographed or otherwise scanned by the mobile device 20 in order to inform the mobile device 20 of the location (and other identifying features) of the door 22.

In some cases, there is a single location identifier 24, such as for example a wireless beacon or a scannable image for both entry and egress through the door 22. In some instances, there may be a location identifier 24 on an entry side of the door 22 and another location identifier 24 on an exit side of the door 22. If the location identifier(s) 24 are wireless beacons, the location identifier 24 on the entry side of the door 22 informs the mobile device 20 that the desired access is entry while the location identifier 24 on the exit side of the door 22 informs the mobile device 20 that the desired access is exit. Similarly, if the location identifier(s) 24 are scannable images such as but not limited to QR codes, scanning the entry side QR code informs the mobile device 20 that the desired access is entry while scanning the exit side QR code informs the mobile device 20 that the desired access is exit.

As can be seen, a remote data entry 26 may be communicatively coupled with the remote server 18. In some cases, the remote data entry 26 may represent a computer such as a laptop computer or a desktop computer. The remote data entry 26 may represent a mobile device such as a smartphone or a tablet. It will be appreciated that the remote data entry 26 may be used for entering information pertaining to a user's access policy. The remote data entry 26 may be used for entering information pertaining to a facility policy and/or an exception policy. In some cases, the remote data entry 26 may be used by security personnel in updating these policies. While described as being remote, it should be understood that this is relative to the location of the door 22, as the remote data entry 26 may be located within the facility housing the door 22. In some cases, the remote data entry 26 may be far away from the facility housing the door 22.

Figure 3:
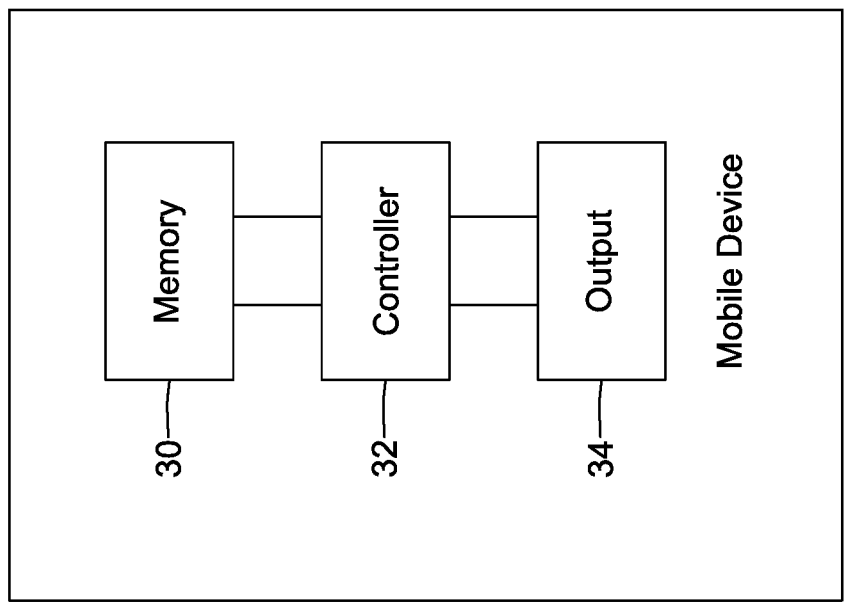
FIG. 3 is a schematic block diagram of an illustrative mobile device usable with the access control systems of FIGS. 1 and 2.

FIG. 3 is a schematic block diagram of the mobile device 20. As noted, the mobile device may be configured to selectively grant access to a space within a facility having a door such as the door 22 (FIG. 2) that restricts access to the space within the facility. The mobile device 20 may include a memory 30 that is configured to store a user's digital identity as well as storing the user's access policies. A controller 32 is operably coupled to the memory 30 and is configured to access the user's digital identity and the user's access policy from the memory 30. The controller 32 may be configured to use the user's digital identity and the user's access policy to determine whether the user is authorized to access the space to which the door restricts access. It is the mobile device 20, therefore, that makes the determination as to whether access is authorized. An output 34 is operably coupled to the controller 32 and is configured to communicate with a reader (such as the reader 14) that is associated with the door (such as the door 22) in order to unlock a lock apparatus of the door when the controller 32 determines that the user is authorized to access the space to which the door restricts access.

In some instances, the controller 32 may be configured to periodically receive updates to the user's access policies from a remote server. For example, the controller 32 may periodically receive updates to the user's access policies from the remote server 18 (FIG. 1) via the gateway 16 (FIG. 1), cellular communication and/or any other suitable communication pathway. In some cases, the controller 32 may receive updates to the user's access policies from the remote server 18 (FIG. 1) via the reader 14. The controller 32 may be configured to periodically receive updates to a facility level policy and/or exception policies from a remote server. In some instances, the controller 32 may be configured to use the facility level policy and/or exception policies as well as the user's access policies and the user's digital identity in determining whether the user is authorized to access the space to which the door restricts access. The mobile device 20 may be configured to establish wireless communications with the reader (such as the reader 14) that is associated with a door in order to receive information identifying the door, and in some cases, updated user's access policies, facility level policies, and/or exception policies.

Figure 4:
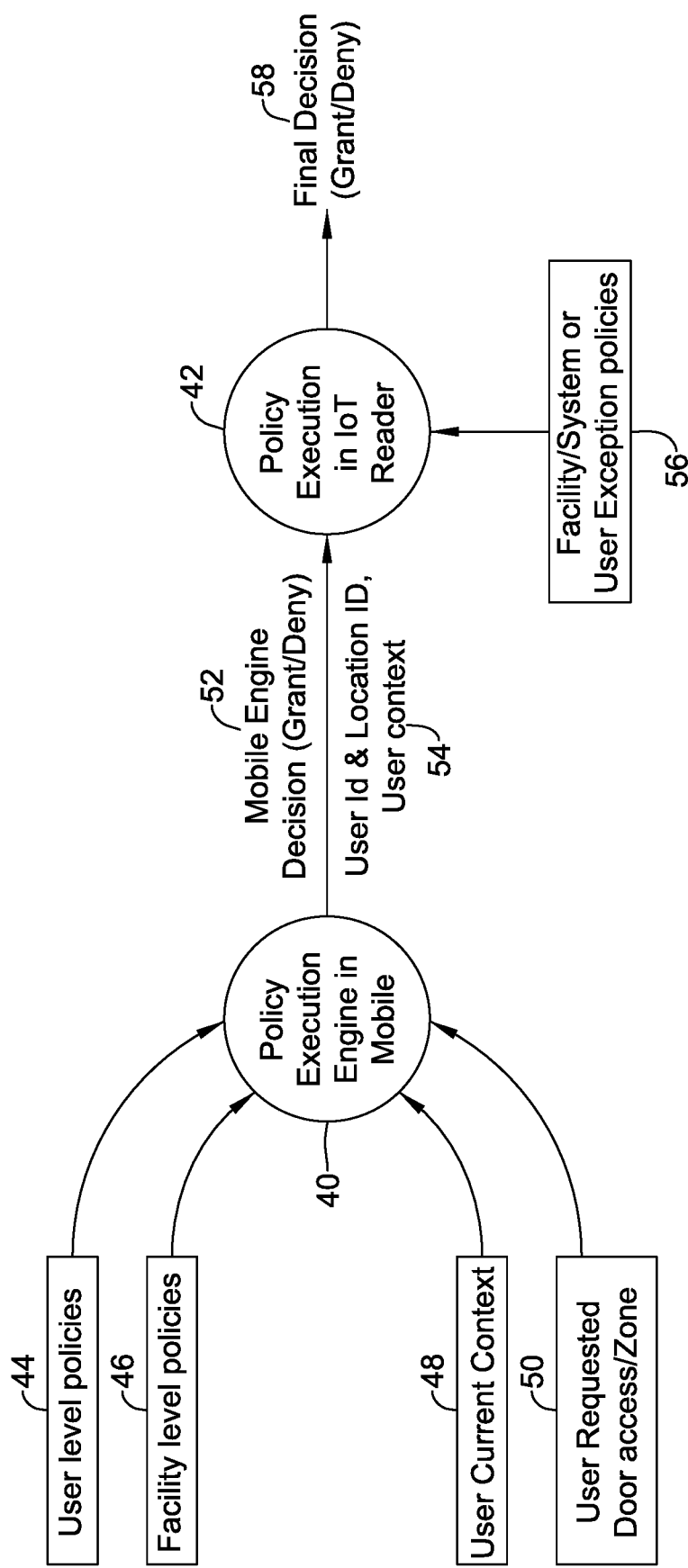
FIG. 4 is a schematic diagram of an illustrative policy execution flow that may be carried out by the access control systems of FIGS. 1 and 2.

FIG. 4 is a schematic diagram showing an illustrative policy execution flow. As illustrated, there is a policy execution engine 40 that is manifested within the mobile device 20 and a policy execution engine 42 that is manifested within the reader 14. A number of data points may be used by the policy execution engine 40, including but not limited to USER level policies 44, FACILITY level policies 46, USER CURRENT CONTEXT 48 and USER REQUESTED ACCESS 50. Based on these inputs, the policy execution engine 40 outputs a mobile engine decision 52 as well as additional information 54 to the policy execution engine 42 within the reader 14. Additional inputs to the policy execution engine 42 includes FACILITY/SYSTEM or USER EXCEPTION policies 56. The policy execution engine 42 will output a final decision 58. In some cases, the final decision 58 may match the mobile engine decision 52. In some instances, the final decision 58 may contradict the mobile engine decision 52.

Figure 5:
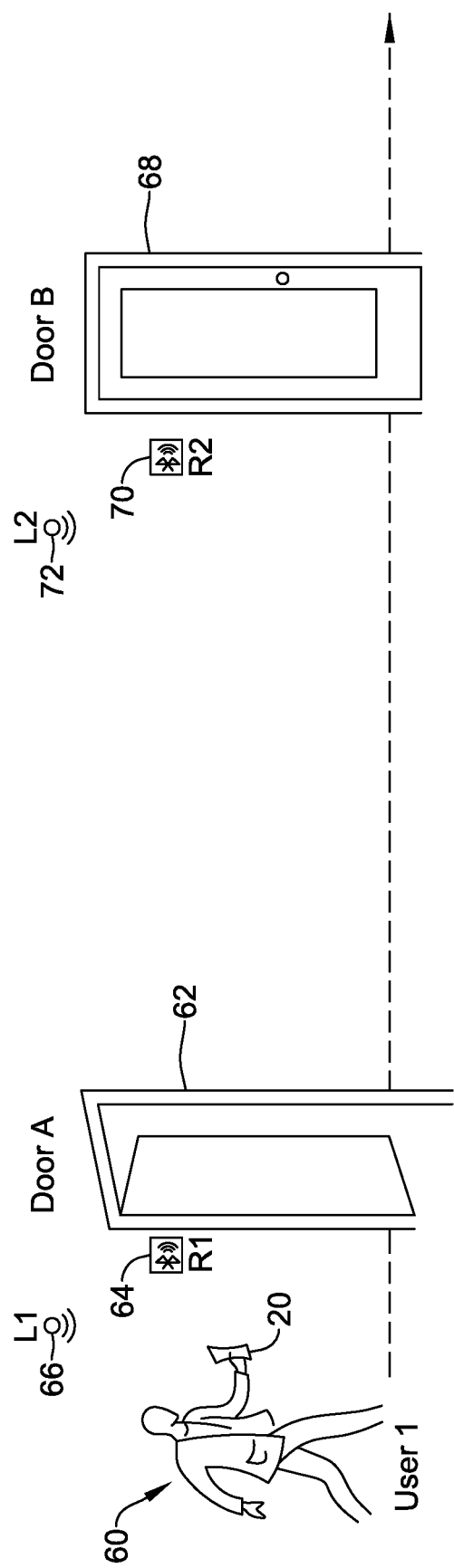
FIG. 5 is a flow diagram showing an illustrative method of controlling access through a door.

FIG. 5 is a schematic diagram showing an illustrative use of user context information. In this example, a second door is only allowed to open for a user when the user entered through a first door. In FIG. 5, a user 60 approaches a door 62 with their mobile device 20 in hand. The mobile device 20 communicates with a reader 64 and with a location identifier 66. For purposes of this illustration, assume that the mobile device 20 decided that access was authorized, and that the reader 64 did not contradict this decision, and thus the door 62 is opened and the user 60 can pass through. As a result, the user's user context information stored in the mobile device 20 is updated to reflect that the user accessed the door 62 at a certain time. The user 60 next approaches the door 68. The mobile device 20 communicates with a reader 70 and with a location identifier 72. Assuming that the user 60 is authorized to access the space beyond the door 68 (as decided by the mobile device 20 and confirmed by the reader 70), and the user's user context information correctly notes that the user passes through the door 62, the reader 70 will instruct the door 68 to open. In this example, if the users had not already passed through door 62 (sometimes within a predetermined period of time), the user would be denied access through door 68.

Figure 6:
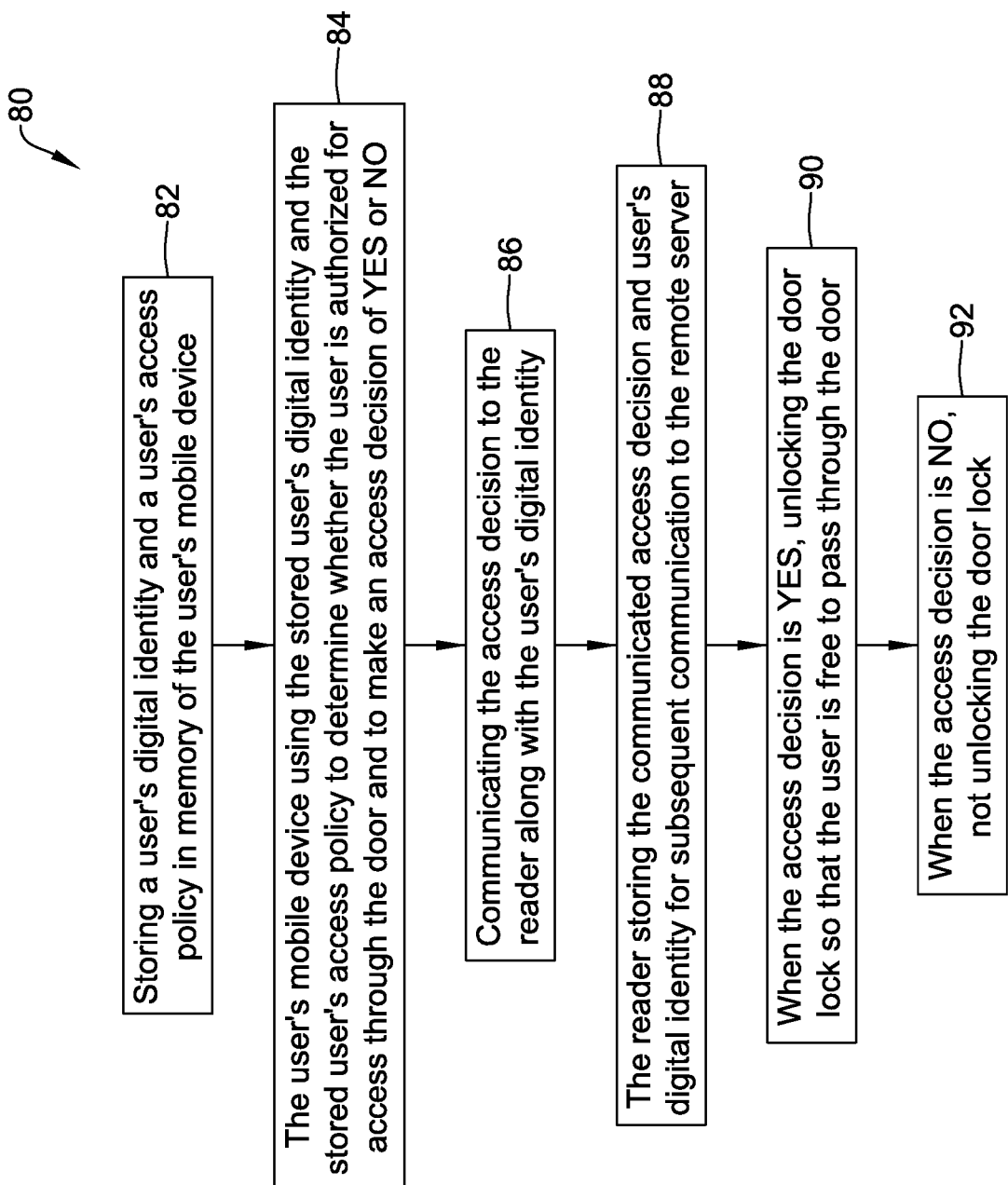
FIG. 6 is a flow diagram showing an illustrative method of controlling access through a door.

FIG. 6 is a flow diagram showing an illustrative method 80 of controlling access through a door having a door lock that can be electrically locked and unlocked, the door lock operably coupled to a reader that is configured to establish local communication with a user's mobile device and to establish non-local communication with a remote server. As indicated at block 82, a user's digital identity and a user's access policy may be stored in memory of the user's mobile device. The user's mobile device may use the stored user's digital identity and the stored user's access policy to determine whether the user is authorized for access through the door and to make an access decision of YES or NO, as indicated at block 84. As noted at block 86, the access decision may be communicated to the reader along with the user's digital identity. The reader stores the communicated access decision and user's digital identity for subsequent communication to the remote server (e.g. log entry) as indicated at block 88. This may be referred to as an access log, for example. When the access decision is YES, as indicated at block 90, the door may be unlocked so that the user can pass through. In some cases, the door is unlocked so that the user is free to enter a space to which access is otherwise restricted by the door or so that the user is free to exit from a space to which egress is otherwise restricted by the door. Alternatively, when the access decision is NO, as indicated at block 92, the door is not unlocked. In some cases, the user's mobile device is configured to use the stored user's digital identity and the stored user's access policy to determine whether the user is authorized for access through the door and to make an access decision of YES or NO even when the user's mobile device is not connected to the remote server.

Figure 7:
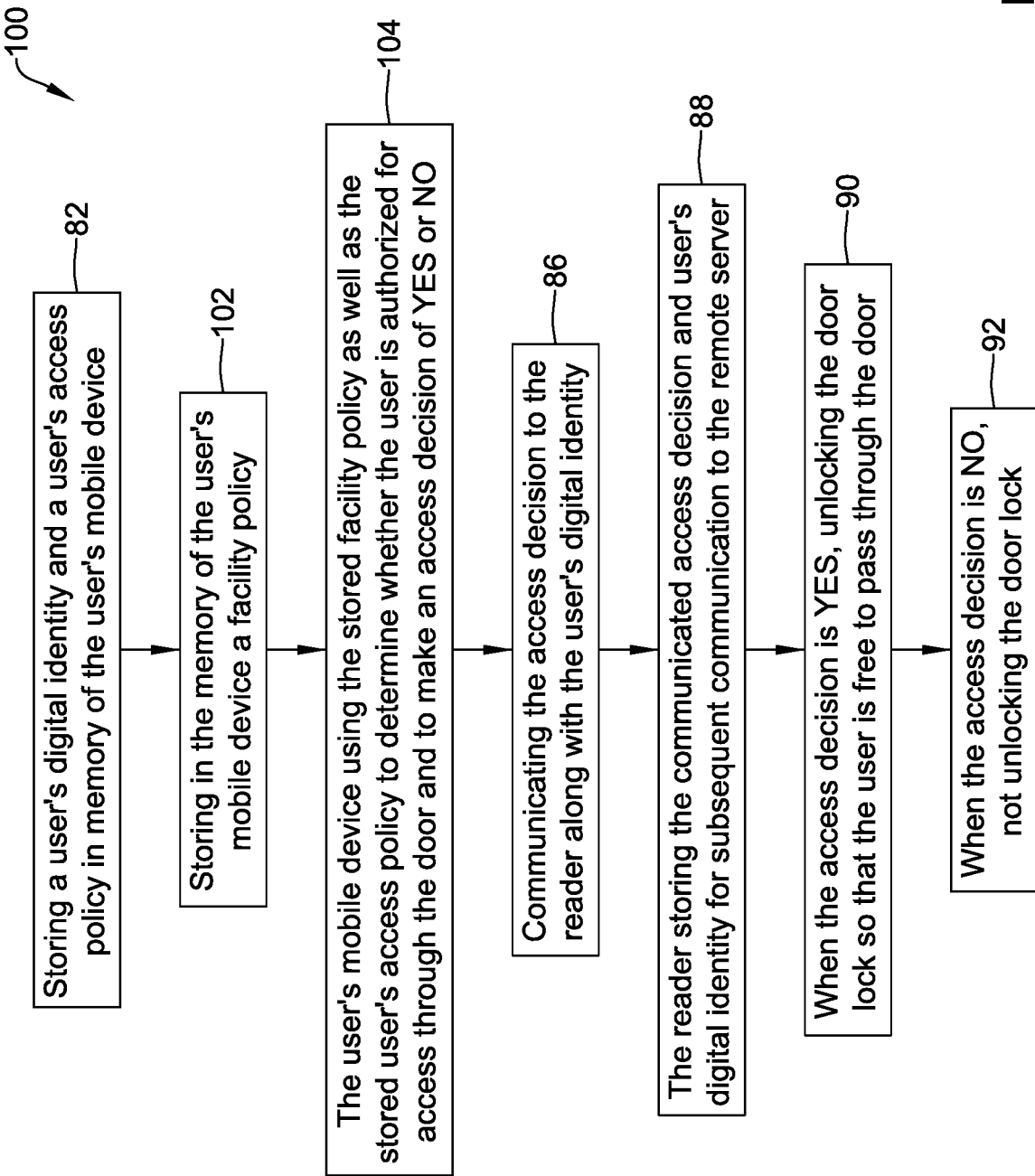
FIG. 7 is a flow diagram showing an illustrative method of controlling access through a door.

FIG. 7 is a flow diagram showing an illustrative method 100 of controlling access through a door having a door lock that can be electrically locked and unlocked, the door lock operably coupled to a reader that is configured to establish local communication with a user's mobile device and to establish non-local communication with a remote server. As indicated at block 82, a user's digital identity and a user's access policy may be stored in memory of the user's mobile device. The memory may also store a facility policy, as indicated at block 102. The user's mobile device may use the stored facility policy as well as the stored user's digital identity and the stored user's access policy to determine whether the user is authorized for access through the door and to make an access decision of YES or NO, as indicated at block 104. As noted at block 86, the access decision may be communicated to the reader along with the user's digital identity. The reader stores the communicated access decision and user's digital identity for subsequent communication to the remote server (e.g. log entry) as indicated at block 88. When the access decision is YES, as indicated at block 90, the door may be unlocked so that the user can pass through. Alternatively, when the access decision is NO, as indicated at block 92, the door is not unlocked.

In some instances, when the facility policy stored in the memory of the user's mobile device does not match a facility policy stored in the reader, the reader may be configured to use the facility policy stored in the reader to override the access decision made by the user's mobile device when the facility policy stored in the reader disagrees with the access decision made by the user's mobile device. In some instances, the reader may also store an exception policy. The reader may use the exception policy to override the access decision made by the user's mobile device when the exception policy disagrees with the access decision made by the user's mobile device.

Figure 8:
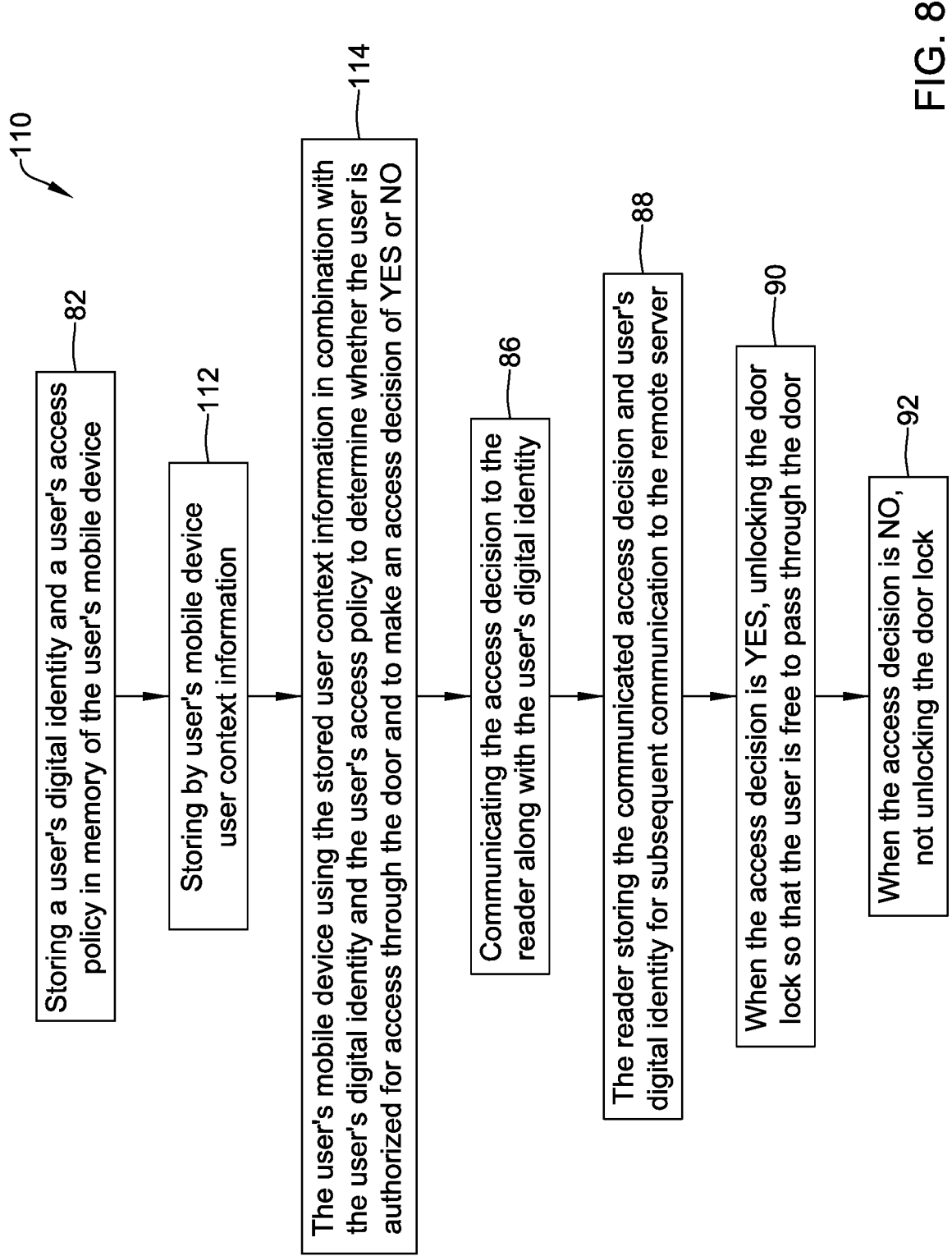
FIG. 8 is a flow diagram showing an illustrative use of user context information.

FIG. 8 is a flow diagram showing an illustrative method 110 of controlling access through a door having a door lock that can be electrically locked and unlocked, the door lock operably coupled to a reader that is configured to establish local communication with a user's mobile device and to establish non-local communication with a remote server. As indicated at block 82, a user's digital identity and a user's access policy may be stored in memory of the user's mobile device. In some cases, the user's mobile device may store user context information as noted at block 112. The user context information may include an access history of which of a plurality of doors of a facility the user has previously accessed, and sometimes other information such as a corresponding time stamp. In some cases, obtaining an access decision of YES for a particular door requires that the user to have previously passed through a different one of the plurality of doors.

The user's mobile device may use the stored user context information in combination with the stored user's digital identity and the stored user's access policy to determine whether the user is authorized for access through the door and to make an access decision of YES or NO, as indicated at block 114. As noted at block 86, the access decision may be communicated to the reader along with the user's digital identity. The reader stores the communicated access decision and user's digital identity for subsequent communication to the remote server (e.g. log entry) as indicated at block 88. This may be referred to as an access log, for example. When the access decision is YES, as indicated at block 90, the door may be unlocked so that the user can pass through. Alternatively, when the access decision is NO, as indicated at block 92, the door is not unlocked.

Figure 9:
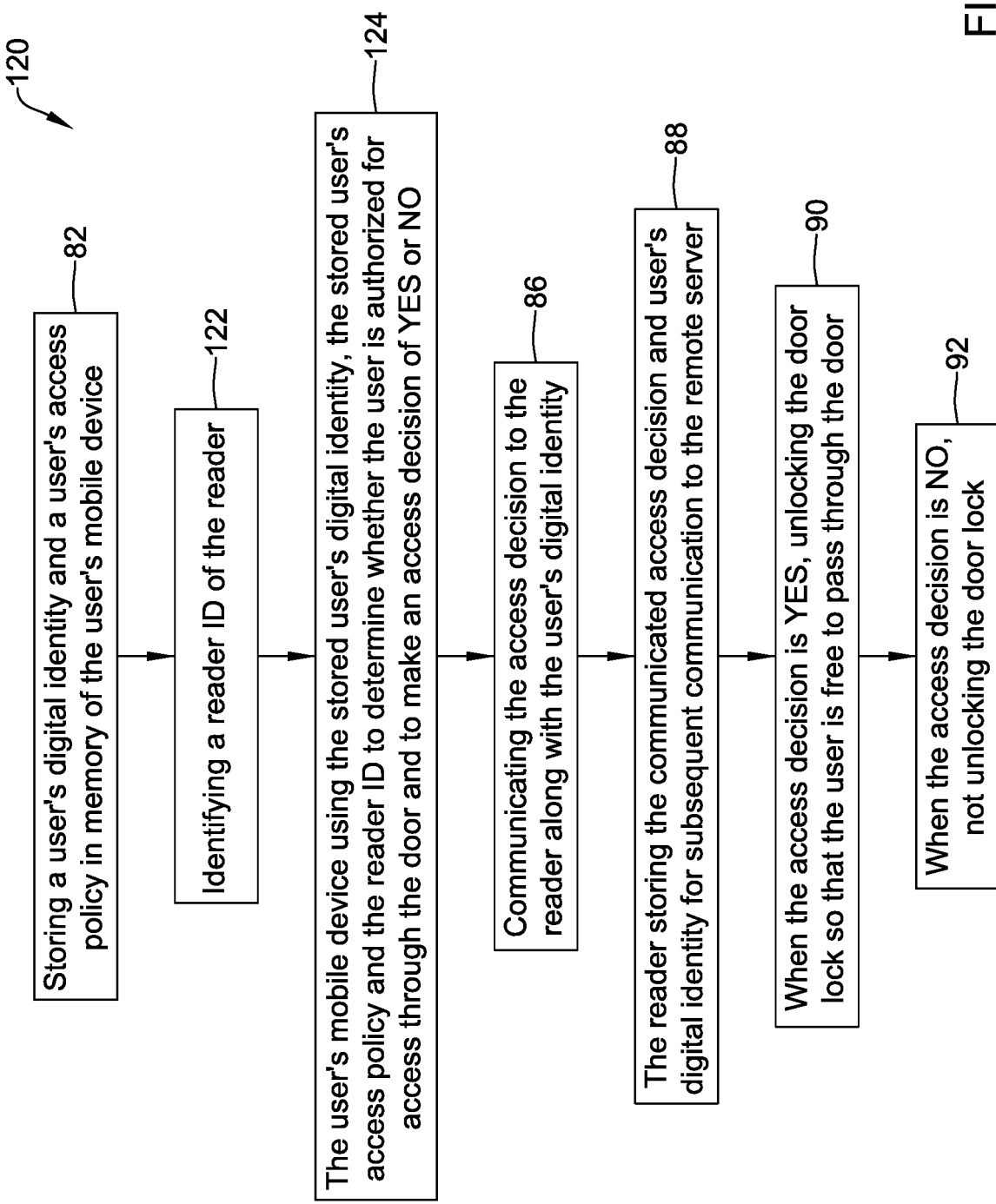
FIG. 9 is a flow diagram showing an illustrative method of controlling access through a door.

FIG. 9 is a flow diagram showing an illustrative method 120 of controlling access through a door having a door lock that can be electrically locked and unlocked, the door lock operably coupled to a reader that is configured to establish local communication with a user's mobile device and to establish non-local communication with a remote server. As indicated at block 82, a user's digital identity and a user's access policy may be stored in memory of the user's mobile device. A reader ID of the reader may be identified as indicated at block 122. In some cases, the reader ID is read from the reader. In some instances, the reader ID is inferred from a location of the user's mobile device.

The user's mobile device may use the stored user's digital identity, the stored user's access policy and the reader ID to determine whether the user is authorized for access through the door and to make an access decision of YES or NO, as indicated at block 124. As noted at block 86, the access decision may be communicated to the reader along with the user's digital identity. The reader stores the communicated access decision and user's digital identity for subsequent communication to the remote server (e.g. log entry) as indicated at block 88. This may be referred to as an access log, for example. When the access decision is YES, as indicated at block 90, the door may be unlocked so that the user can pass through. In some cases, the door is unlocked so that the user is free to enter a space to which access is otherwise restricted by the door or so that the user is free to exit from a space to which egress is otherwise restricted by the door.

Figure 10:
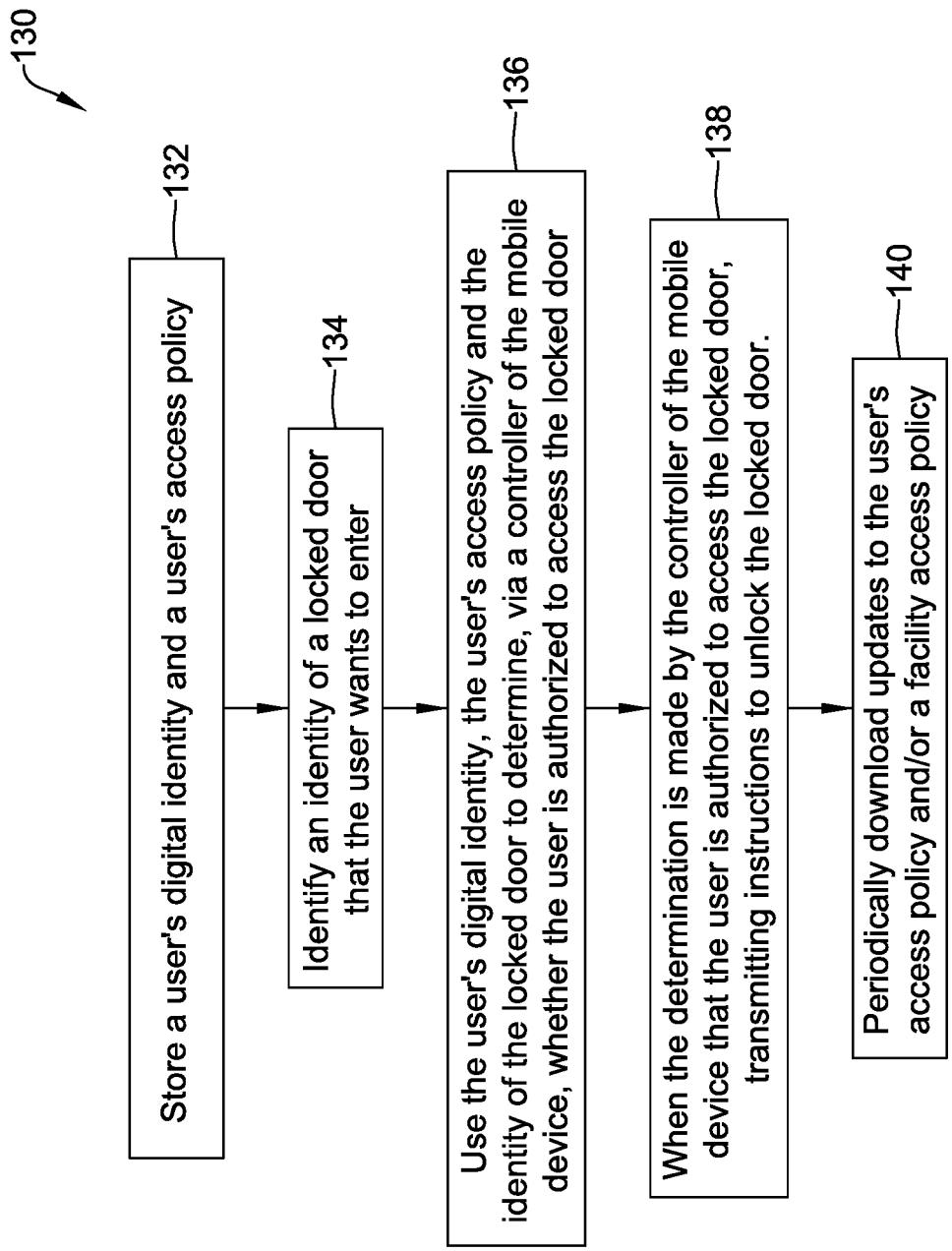
FIG. 10 is a flow diagram showing an illustrative method of controlling access through a door.

FIG. 10 is a flow diagram of an illustrative method 130 that may be carried out by a mobile device when executing executable instructions. As indicated at block 132, the mobile device may be caused to store a user's digital identity and a user's access policy. As indicated at block 134, the mobile device may be caused to identify an identity of a locked door that the user wants to enter. For example, the mobile device may be configured to identify the locked door by scanning an image disposed proximate the locked door or by wirelessly communicating with a beacon that is disposed proximate the locked door. As indicated at block 136, the mobile device may be caused to use the user's digital identity, the user's access policy and the identity of the locked door to determine, via a controller of the mobile device, whether the user is authorized to access the locked door. As indicated at block 138, when the determination is made by the controller of the mobile device that the user is authorized to access the locked door, the mobile device is caused to transmit instructions to unlock the locked door. In some instances, as indicated at block 140, the mobile device may be caused to periodically download updates to the user's access policy and/or a facility access policy.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of controlling access through a door having a door lock that can be electrically locked and unlocked, the door lock operably coupled to a reader that is configured to establish local communication with a user's mobile device and to establish non-local communication with a remote server, the method comprising:
storing a user's digital identity and a user's access policy in memory of the user's mobile device;
the user's mobile device using the stored user's digital identity and the stored user's access policy to determine whether the user is authorized for access through the door and to make an access decision of YES or NO;
communicating the access decision to the reader along with the user's digital identity;
the reader storing the communicated access decision and user's digital identity for subsequent communication to the remote server;
when the access decision is YES, unlocking the door lock so that the user is free to pass through the door; and
when the access decision is NO, not unlocking the door lock.

2. The method of claim 1, further comprising:
storing in the memory of the user's mobile device a facility policy; and
using by the user's mobile device the facility policy in addition to the user's digital identity and the user's access policy in determining whether the user is authorized for access through the door and to make the access decision of YES or NO.

3. The method of claim 2, further comprising:
when the facility policy stored in the memory of the user's mobile device does not match a facility policy stored in the reader, the reader is configured to use the facility policy stored in the reader to override the access decision made by the user's mobile device when the facility policy stored in the reader disagrees with the access decision made by the user's mobile device.

4. The method of claim 3, further comprising:
storing by the reader an exception policy; and
the reader using the exception policy to override the access decision made by the user's mobile device when the exception policy disagrees with the access decision made by the user's mobile device.

5. The method of claim 1, further comprising:
storing by the user's mobile device user context information; and
using by the user's mobile device the stored user context information in combination with the user's digital identity and the user's access policy in determining whether the user is authorized for access through the door and to make the access decision of YES or NO.

6. The method of claim 5, wherein the user context information includes an access history of which of a plurality of doors of a facility that the user has previously accessed.

7. The method of claim 6, wherein obtaining an access decision of YES for the door requires that the user previously passed through a different one of the plurality of doors.

8. The method of claim 1, wherein when the access decision is YES, the door lock is unlocked so that the user is free to enter a space to which access is otherwise restricted by the door or so that the user is free to exit from a space to which egress is otherwise restricted by the door.

9. The method of claim 1, wherein the user's mobile device is configured to use the stored user's digital identity and the stored user's access policy to determine whether the user is authorized for access through the door and to make an access decision of YES or NO even when the user's mobile device is not connected to the remote server.

10. The method of claim 1, further comprising:
identifying a reader ID of the reader;
the user's mobile device using the stored user's digital identity, the stored user's access policy and the reader ID to determine whether the user is authorized for access through the door and to make an access decision of YES or NO.

11. The method of claim 10, wherein the reader ID is read from the reader.

12. The method of claim 10, wherein the reader ID is inferred from a location of the user's mobile device.

13. A mobile device configured to selectively grant access to a space within a facility having a door restricting access to the space within the facility, the mobile device comprising:
a memory configured to store a user's digital identity;
the memory further configured to store a user's access policies;
a controller operably coupled to the memory, the controller configured to access the user's digital identity and the user's access policies from the memory, the controller further configured to use the user's digital identity and the user's access policies to determine whether the user is authorized to access the space to which the door restricts access; and
an output operably coupled to the controller, the output configured to communicate with a reader that is associated with the door in order to unlock a lock apparatus of the door when the controller determines that the user is authorized to access the space to which the door restricts access.

14. The mobile device of claim 13, wherein the controller is configured to periodically receive updates to the user's access policies from a remote server.

15. The mobile device of claim 13, wherein the controller is configured to periodically receive updates to a facility level policy from a remote server.

16. The mobile device of claim 15, wherein the controller is configured to use the facility level policy as well as the user's access policies and the user's digital identity in determining whether the user is authorized to access the space to which the door restricts access.

17. The mobile device of claim 13, wherein the mobile device is configured to establish wireless communications with the reader that is associated with the door and to receive information identifying the door.

18. A non-transitory computer-readable medium having instructions stored thereon executable by a processor of a mobile device, the instructions when executed causing the mobile device to:
store a user's digital identity and a user's access policy;
identify an identity of a locked door that the user wants to enter;
use the user's digital identity, the user's access policy and the identity of the locked door to determine, via a controller of the mobile device, whether the user is authorized to access the locked door; and
when the determination is made by the controller of the mobile device that the user is authorized to access the locked door, transmitting instructions to unlock the locked door.

19. The non-transitory computer-readable medium of claim 18, wherein the instructions when executed further cause the mobile device to periodically download updates to the user's access policy and/or a facility access policy.

20. The non-transitory computer-readable medium of claim 18, wherein the mobile device is configured to identify the locked door by scanning an image disposed proximate the locked door or by wirelessly communicating with a beacon that is disposed proximate the locked door.

* * * * *